(12) United States Patent
Saltarelli et al.

(10) Patent No.: US 12,320,211 B1
(45) Date of Patent: Jun. 3, 2025

(54) SYSTEMS AND APPARATUS FOR ORIENTING ONE OR MORE TOOLS IN A TOOL STRING AND METHODS OF MANUFACTURE, ASSEMBLY AND USE THEREOF

(71) Applicant: SWM International, LLC, Pampa, TX (US)

(72) Inventors: Terrell Cray Saltarelli, Weatherford, TX (US); Dan Salkhai Ang, Keller, TX (US)

(73) Assignee: SWM International, LLC

( * ) Notice: Subject to any disclaimer, the term of this patent is extended or adjusted under 35 U.S.C. 154(b) by 0 days.

(21) Appl. No.: 18/137,738

(22) Filed: Apr. 21, 2023

(51) Int. Cl.
*E21B 17/16* (2006.01)
*E21B 17/043* (2006.01)
*E21B 19/16* (2006.01)
*F16L 19/00* (2006.01)
*F16L 19/02* (2006.01)

(52) U.S. Cl.
CPC ............ *E21B 17/16* (2013.01); *E21B 17/043* (2013.01); *F16L 19/005* (2013.01); *F16L 19/0206* (2013.01); *E21B 19/161* (2013.01)

(58) Field of Classification Search
CPC ...... E21B 17/16; E21B 17/043; E21B 19/161; F16L 19/005; F16L 19/0206; F16L 19/02
See application file for complete search history.

(56) References Cited

U.S. PATENT DOCUMENTS

| 2019/0003265 A1* | 1/2019 | McLaughlin | E21B 17/04 |
| 2020/0308938 A1* | 10/2020 | Sullivan | E21B 43/119 |
| 2020/0386060 A1* | 12/2020 | Sullivan | F16L 37/26 |

* cited by examiner

*Primary Examiner* — Caroline N Butcher
(74) *Attorney, Agent, or Firm* — E. Randall Smith; E. Randall Smith, P.C.

(57) ABSTRACT

An orienting tool includes a main body and collar, each connectable and disconnectable to at least one among a first set of interconnected tools and a second set of interconnected tools. In a setup configuration, at least one among the main body and collar, along with a respective tool set connected thereto, are rotatable relative to the other. In an operating configuration, a locking ring allows the main body to be rotationally locked to the collar.

17 Claims, 8 Drawing Sheets

SYSTEMS AND APPARATUS FOR ORIENTING ONE OR MORE TOOLS IN A TOOL STRING AND METHODS OF MANUFACTURE, ASSEMBLY AND USE THEREOF

FIELD OF THE DISCLOSURE

The present disclosure relates generally to apparatus and systems for orienting one or more tools in a tool string and methods of manufacture, assembly and use thereof, and in some embodiments, the use of an orientation tool for selectively orienting a tool or tool string section (e.g., in oilfield-related operations).

BACKGROUND

In downhole and similar operations, a tool string carrying one or more tools for performing tasks in the borehole may be utilized. In such operations, it is often desirable to selectively orient at least one tool in the tool string. This capability may be useful for any variety of reasons depending upon the situation, such as, in some instances, when certain tools need to face a certain way in borehole to perform their functions. For example, in the arena of hydraulic fracturing and related operations, it is typically desirable to orient one or more perforating gun(s) so their explosives will penetrate the underground earthen formation in a desired direction from the well bore.

In various presently known systems, one or more tools (e.g., perforating guns) on a tool string are oriented with a single-piece, top sub used to connect the tools uphole of the top sub (the "upper tools") to the tools downhole of the top sub (the "lower tools"). Typically, the top sub is threadably engaged with the upper and lower tools at the respective ends of the top sub and the lower tools are oriented into a desired position relative to the upper tools by backing-up the lower tools at the threaded connection with the top sub. A small, thin ring threaded to the OD of the top sub is then threaded down tight against the top of the lower tools to secure the desired orientation.

This sort of arrangement may have one or more disadvantages. For example, the connection and relationship of the uphole tools to the downhole tools will essentially depend upon the threads, strength and integrity of the small, thin, threaded ring on the top sub, which can be hard to manage at the work site and unreliable (e.g., less reliable and solid than standard threaded connections between tool string components). For another example, securing the threaded ring against the upper end of the downhole tools typically leaves a gap in the OD of the top sub (and thus the entire tool string), which is undesirable because debris can get trapped there and cause problems, the tool string can get hung up in the borehole at the gap, for other reasons or a combination thereof. For still a further example, backing up the threaded connection between the top sub and the uppermost downhole tool can uncover or otherwise compromise one or more seals. For yet another possible downside, the top sub is typically designed with a pin connection having male threads at the downhole end, verses a box connection with female threads, for engagement with the downhole tool string, which could be another point of weakness.

Accordingly, there exists a need for improved systems, apparatus and methods useful for orienting downhole tools having one or more of the attributes or capabilities described or shown in this patent or as may be apparent therefrom.

It should be understood that the above-described disadvantages, limitations, features, capabilities, examples, advantages and other details are provided for illustrative purposes only and are not intended to limit the scope or subject matter of this disclosure or the appended claims. Thus, none of the appended claims should be limited by or to the above discussion, disadvantages, limitations, features, examples or the details thereof.

BRIEF SUMMARY OF THE DISCLOSURE

In various embodiments, the present disclosure involves an orienting tool useful for connecting and orienting a first set of interconnected tools of a tool string with and relative to a second set of interconnected tools of the tool string prior to deployment of the tool string in a borehole. The orienting tool includes a main body and collar, each being connectable to and disconnectable from at least one among the first and second tool sets. In each particular use of the orienting tool, the collar is configured to be connected to whichever tool set the main body is not connected to. The main body and collar are interconnected so that, in a setup configuration of the orienting tool, at least one among the main body and collar, along with the respective tool set connected thereto, are rotatable relative to the other. A locking ring is associated with at least one among the main body and collar and configured, in the setup configuration, to allow at least one among the main body and collar, along with the respective tool set connected thereto, to be rotated relative to the other. In an operating configuration of the orienting tool, the locking ring is configured to allow the main body and tool set connected thereto to be rotationally locked relative to the collar and tool set connected thereto.

Any of these features may be included, if desired. The locking ring may be configured to be gripped and rotated in order to rotate one among the main body and collar relative to the other. In the operating configuration, the locking ring may be rigidly sandwiched between a tool of the first or second tool sets and one among the main body and collar. At least one gripper may be extendable through the collar and selectively engageable with the main body.

The collar may be configured to be slidably engageable over the main body from the uphole end thereof and the locking ring may be slidably engageable over the main body uphole of the collar and configured to be rotationally lockable to the main body. The main body may include at least a first protrusion extending outwardly therefrom closer to the downhole end than the uphole end thereof and the collar may be configured to be slidably engageable over the main body until at least a first protrusion of the collar abuts the first protrusion of the main body. The locking ring may be unthreaded and configured to slide over the main body until at least one flat thereof aligns over at least one flat of the main body to rotationally lock the locking ring to the main body.

The first tool set may be uphole of the orienting tool and include at least a first eccentric weight bar and the second tool set may be downhole of the orienting tool and include at least a first perforating gun having multiple shape charges. In a setup configuration, the main body, collar and locking ring may be configured to allow the shape charges of the first perforating gun to be oriented relative to the first eccentric weight bar as desired. In an operating configuration, the main body, collar and locking ring may be configured to lock that desired orientation prior to deployment of the tool string in the borehole.

In many embodiments, the present disclosure involves methods of connecting and orienting a first set of interconnected tools of a tool string with and relative to a second set of interconnected tools of the tool string prior to deployment of the tool string in a borehole with the use of an orienting tool. The orienting tool includes a main body and collar, each connectable to and disconnectable from at least one among the first and second sets of tools, and a locking ring associated with at least one among the main body and collar. These methods include partially connecting either the main body or collar to the first tool set and fully connecting the other among the main body and collar to the second tool set. At least one among the main body and collar, along with the respective tool set connected thereto, is rotated relative to the other. Without rotating either tool set relative to the other, whichever among the main body and collar that was partially connected to one of the tool sets is fully connected thereto to rotationally lock the first and second tools sets together.

Any of these features may be included, if desired. A locking ring may be engaged with at least one among the main body and collar. The locking ring may not be threadably engaged with the main body or collar. The locking ring may be gripped and rotated to rotate one among the main body and collar to connect it to the first or second tool set. Fully connecting whichever among the main body and collar was partially connected to one of the tool sets to that tool set may ensure there are no spaces between the orienting tool and the first tool set or the second tool set, or between the main body, collar and locking ring along the outer diameter of the tool string between the first and second tool sets. The collar may include a bore and provide a space therein between the main body and an adjacent tool of first or second tool set.

The collar may be slidably engaged over the main body from the uphole end of the main body until at least a first protrusion of the collar abuts at least a first protrusion of the main body. The locking ring may be slid over the main body uphole of the collar until at least one flat of the locking ring aligns over at least one flat of the main body to rotationally lock the locking ring and main body. The main body may be initially partially connected to the first tool set, wherein fully connecting the main body to the first tool set draws the collar and locking ring axially toward the first tool set until the locking ring is rigidly sandwiched between the collar and first tool set. Fully connecting the main body to the first tool set may prevent relative linear movement between the main body, locking ring, collar and first and second tools sets.

Certain embodiments of the present disclosure involve an orienting tool useful for connecting and orienting a first set of interconnected tools of a tool string with and relative to a second set of interconnected tools of the tool string prior to deployment of the tool string in a borehole. The orienting tool includes a mandrel and collar, each connectable to and disconnectable from at least one among the first and second sets of tools. In each particular use of the orienting tool, the collar is configured to be connected to whichever set of tools the main body is not connected to. The main body and collar are interconnected so that, in a setup configuration of the orienting tool, at least one among the main body and collar, along with the respective tool set connected thereto, are rotatable relative to the other. An unthreaded locking ring is engageable and rotatable with the mandrel or collar and configured to be rotated in order to connect it to the corresponding tool set. When the orienting tool is in a setup configuration, the locking ring is rotatable to rotate at least one among the main body and collar, along with the respective tool set connected thereto, relative to the other. When the orienting tool is in an operating configuration, the locking ring is configured to allow the main body and tool set connected thereto to be rotationally locked relative to the collar and tool set connected thereto, and a first end of the locking ring abuts the mandrel or collar and a second end of the locking ring abuts a tool from the first or second tool set. If desired, the mandrel and collar may be elongated, and the mandrel, collar and locking ring may be distinct and separate from each other.

In some embodiments, the present disclosure involves an orienting tool useful for coupling and orienting a plurality of lower tools of a tool string with and relative to a plurality of upper tools of the tool string prior to deployment of the tool string in a borehole. The orienting tool includes a mandrel having an uphole end and a downhole end and being rigidly, releasably engageable at the uphole end thereof with the lowermost upper tool. An annular collar is slidably engageable over and selectively rotatable relative to the mandrel and rigidly, releasably engageable with the uppermost lower tool. An unthreaded locking ring is slidably engageable over the mandrel uphole of the annular collar and configured to be selectively rotationally lockable to the mandrel and rigidly sandwichable between the upper tools and the annular collar. The annular collar and lower tools are rotatable relative the locking pin, mandrel and upper tools to selectively orient the lower tools relative to the upper tools and the locking ring may thereafter be rigidly sandwiched between the annular collar and upper tools to help lock the orientation of the lower tools relative to the upper tools.

Any of these features may be included, if desired. The locking ring may be configured to be gripped and rotated in order to rotate the mandrel. The mandrel may be threadably engageable with the lowermost upper tool and the locking ring may include at least one outer surface configured to be gripped and/or rotated to threadably engage the mandrel with the lowermost upper tool without rotating the annual collar.

When the annular collar is fully engaged with the uppermost lower tool and the mandrel is fully engaged with the lowermost upper tool, the mandrel, annular collar and locking ring may be configured to secure the position of the lower tools relative to the upper tools without allowing or forming any gaps in the outer diameter of the tool string between the lowermost upper tool and the uppermost lower tool, the mandrel, annular collar and locking ring may be configured to rotationally lock the position, and disallow relative linear movement, of the lower tools relative to the upper tools, the locking ring may be configured to abut the lowermost upper tool and the annular collar at opposite ends thereof, respectively, or a combination thereof.

The lower tools may include at least a first perforating gun having multiple shape charges and the upper tools may include at least a first eccentric weight bar. The mandrel, annular collar and locking ring may be configured to allow the shape charges of the first perforating gun to be oriented relative to the first eccentric weight bar as desired and lock that desired orientation prior to deployment of the tool string in the borehole.

The mandrel may include at least a first protrusion extending outwardly therefrom closer to the downhole end than the uphole end thereof and the annular collar may be configured to be slidably engageable over the mandrel from the uphole end of the mandrel until at least a first protrusion of the annular collar abuts the first protrusion of the mandrel. Each respective first protrusion may be a circular shoulder. The locking ring may be configured to slide over the mandrel until at least one flat of the locking ring aligns over at least one flat of the mandrel to rotationally lock the locking ring to the mandrel. At least one gripper may be extendable through the annular collar and selectively engageable with the mandrel.

In many embodiments, the present disclosure involves methods of orienting a plurality of lower tools of a tool string relative to a plurality of upper tools of the tool string connectable together with an orienting tool prior to deployment of the tool string in a borehole. The orienting tool includes an elongated mandrel, an elongated collar slidably engageable over the mandrel and being selectively independently rotatable relative to, and selectively concurrently axially moveable with, the mandrel. A locking ring is slidably engageable over the mandrel uphole of the collar and selectively rotationally locked relative to, and selectively concurrently linearly moveable with, the mandrel. These methods include fully threadably engaging the collar with the uppermost lower tool after the collar is slidably engaged over the mandrel. After the locking ring is slidably engaged over the mandrel, the mandrel is partially threadably engaged with lowermost upper tool. The collar is rotated with the lower tools coupled thereto relative to the mandrel, locking ring and upper tools to the desired orientation of the lower tools relative to the upper tools. The mandrel is fully engaged with the lowermost upper tool without rotating the upper tools, collar and lower tools to rigidly sandwich the locking ring between the lowermost upper tool and the collar and prevent rotational movement of the upper tools relative to the lower tools.

Any of these features may be included, if desired. The locking ring may not be threadably engaged with the mandrel or collar. The locking ring may be gripped and rotated to threadably engage the mandrel with the lowermost upper tool. Fully threadably engaging the mandrel to the lowermost upper tool may draw the collar and locking ring axially toward the lowermost upper tool until the locking ring is rigidly sandwiched between the collar and lowermost upper tool, ensure there are no gaps in the outer diameter of the tool string between the lowermost upper tool and the uppermost lower tool, rotationally lock and prevent relative linear movement between the mandrel, locking ring and collar or a combination thereof.

The collar may be slidably engaged over the mandrel from the uphole end of the mandrel until at least a first protrusion of the annular collar abuts at least a first protrusion of the mandrel. The locking ring may be slidably engaged over the mandrel until at least one flat of the locking ring aligns over at least one flat of the mandrel to rotationally lock the locking ring and mandrel. The collar may provide a space in a bore thereof between the mandrel and upper end of the uppermost lower tool.

Accordingly, the present disclosure includes features and advantages which are believed to enable it to advance downhole tool string technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF PRESENTLY PREFERRED EMBODIMENTS

Figure 1:
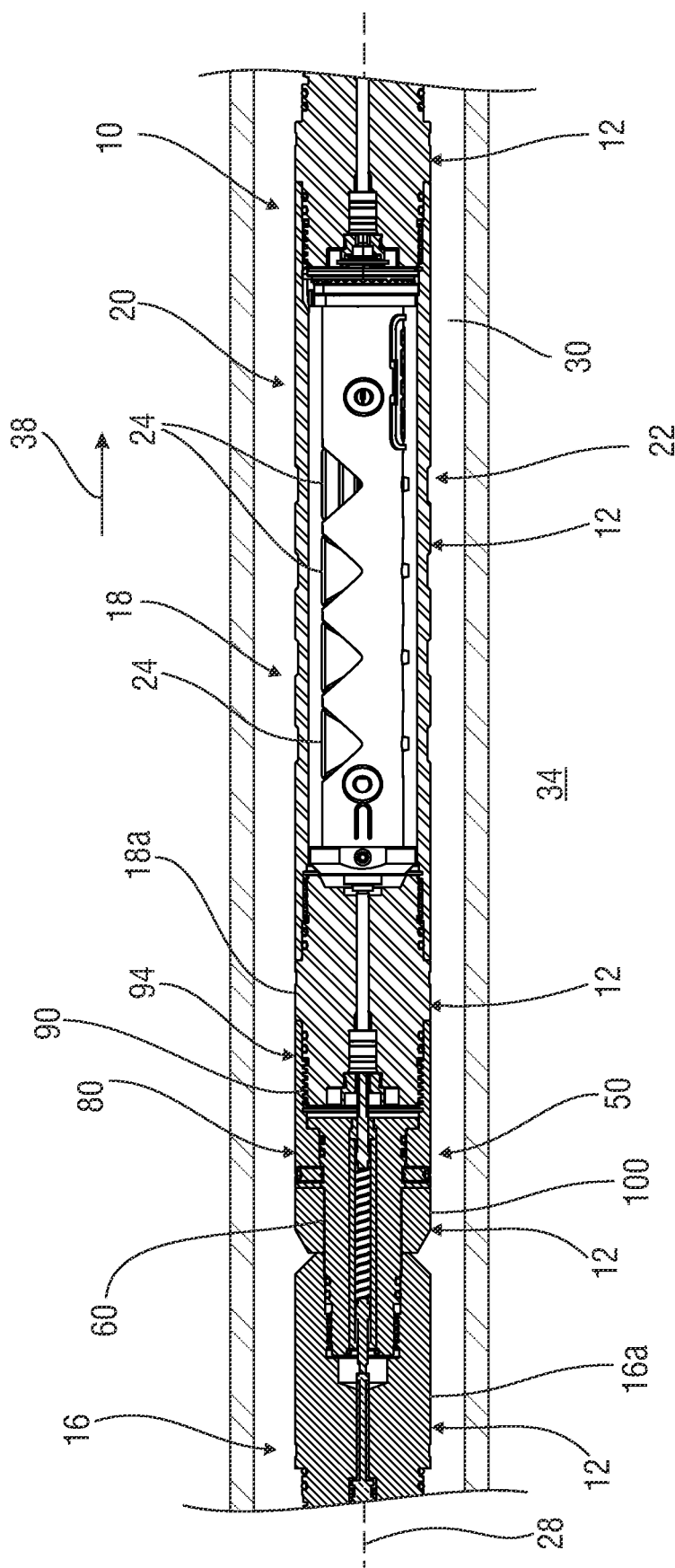
FIG. 1 is a partial cross-sectional view of an exemplary orienting tool included in an exemplary tool string having one or more perforating guns shown in a borehole in accordance with one or more embodiments of the present disclosure.

Characteristics and advantages of the present disclosure and additional features and benefits will be readily apparent to those skilled in the art upon consideration of the following detailed description of exemplary embodiments and referring to the accompanying figures. It should be understood that the description herein and appended drawings, being of exemplary embodiments, are not intended to limit the claims of this patent (or any patent or patent application claiming priority hereto). On the contrary, the intention is to cover all modifications, equivalents and alternatives falling within the spirit and scope of this disclosure and the claims. Many changes may be made to the particular embodiments and details disclosed herein without departing from such spirit and scope.

In showing and describing preferred embodiments in the appended figures, common or similar components, features and elements are referenced with like or identical reference numerals or are apparent from the figures and/or the description, claims and other parts of this patent. The figures are not necessarily to scale and certain features and certain views of the figures may be shown exaggerated in scale or in schematic in the interest of clarity and conciseness.

When reference numbers are followed by a lowercase letter (e.g., connectors 410*a*, 410*b*), they are each the same type of component or item (e.g., a connector 410) having the same features, but having a different location, use or other characteristic(s). As used herein and throughout various portions (and headings) of this patent (including the claims), the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular features and components. As one skilled in the art will appreciate, different persons may refer to a feature or component by different names and this document does not intend to distinguish between components and features that differ in name but not function. Reference herein and in the appended claims to components, features and aspects in a singular tense does not necessarily limit the present disclosure or appended claims to only one such component, feature or aspect, but should be interpreted generally to mean one or more, except and only to the extent as may be expressly specified otherwise herein or in any particular claims hereof and only for such specific references or claims and other claims depending therefrom. The use of "(s)" in reference to an item, aspect, component, feature or action (e.g., "surface(s)") should be construed to mean "at least one".

As used throughout and in all parts of this patent, the following terms have the following meanings, except and only to the extent as may be expressly specified otherwise:

The term "and/or" as used herein provides for three distinct possibilities: one, the other or both. All three possibilities do not need to be available-only any one of the three. For example, if an embodiment of a component is described as "having a collar and/or a coupling", it may include only one or more collars, only one or more couplings or at least one of each. Thus, the use of "and/or" herein does not require all three possibilities, just any one or more of the three possibilities. A claim limitation that recites "having a collar and/or a coupling" would be literally infringed by a device including only one or more collars, one or more couplings or both one or more couplings and one or more collars.

The phrase "at least one among" as used herein generally has the same meaning as "and/or". For example, if an embodiment of a component is described as "having at least one among a collar, a coupling and a connector", it may include only one or more collars, only one or more couplings, only one or more connectors or any combination thereof. Thus, the use of "at least one among" herein and in any claims related hereto does not require all those possibilities to be available, just any one or more of them. Accordingly, a claim limitation that recites "having at least one among a collar, a coupling and a connector" would be literally infringed by a device including only one or more collars, one or more couplings, one or more connectors or any combination thereof.

The terms "coupled", "connected", "engaged" and the like, and variations thereof refer to and include either an indirect or direct connection or engagement. Thus, if a first device couples to a second device, that connection may be through a direct connection, or through an indirect connection via other devices and/or connections.

The terms "downhole" and variations thereof mean in a hole, space or other at least partially enclosed area that may be underground or aboveground and within which a tool string may be used.

The terms "elongated" and variations thereof mean an item having an overall length (during the intended use of the item) that is greater than its average width.

The terms "flat" and variations thereof mean and refer to a portion of the referenced component that includes at least one surface having a different shape than one or more adjacent surfaces of that component.

The terms "for example, "e.g.,", "such as" and variations thereof are used to provide one or more possible examples of the referenced item, feature, detail, circumstance, etc. that may occur in some instances. Such examples are not required for every embodiment or any claims, except and only to the extent as may be expressly specified otherwise herein or in any particular claims hereof and only for such specific references or claims and other claims depending therefrom.

The terms "generally", "substantially" and variations thereof mean and include greater than 50%.

The terms "including" and "comprising" are used herein and in the appended claims in an open-ended fashion, and thus should be interpreted to mean "including, but not limited to".

The terms "operator", "assembler" and variations thereof mean and include one or more humans, robots or robotic components, artificial intelligence-driven components/circuitry, other components and the like.

The terms "perforating gun string", "gun string" and variations thereof mean and refer to a tool string that include at least one downhole perforating gun.

The terms "rigidly engaged", "rigidly secured", "rigidly sandwiched", "rigidly coupled) and the like and variations thereof mean that one or more of the referenced components is not moveable during typical, or expected, operations relative to at least one other component in at least one axis or plane, with allowances for some minor, insubstantial, nominal or minimal movement that may occur. For example, if component A is rigidly sandwiched between components B & C axially in a longitudinal axis, component A is not movable axially or linearly (more than minimally, if at all) relative to components B and/or C during typical or expected operations.

The terms "tool" and variations thereof refer to and include one or more devices, items of equipment or components connectable to at least one other such tool and insertable into a borehole. The tools may be useful for any desired purpose, such as performing one or more tasks, connecting other tools and the like. In oilfield operations, for example, the tool may be a device or equipment used during well drilling, completion, intervention, production, workover or other activities in an underground borehole, connectors used therewith, other components and the like. However, the term "tool" as used herein is not limited to only oilfield devices, applications and functions or use in only underground boreholes.

The terms "tool string" and variations thereof refer to and include one or more interconnected tools.

It should be noted that any of the above terms may be further explained, defined, expanded or limited below or in other parts of this disclosure. Further, the above list of terms is not all inclusive, and other terms may be defined or explained below or in other sections of this patent.

Referring initially to FIG. 1, a typical (e.g., oilfield) tool string 10 includes one or more components, or tools, 12 aligned and interconnected in a common longitudinal axis 28 (a.k.a. axially) to allow their insertion into, movement within and removal from a borehole 30 (e.g., formed in an earthen formation 34). The tool string 10 is shown here with its uphole side or end on the left, and its downhole side or end on the right, as if the tool string 10 would be lowered into the borehole 30 from left-to-right represented with arrow 38. The illustrated tool string 10 includes an exemplary orienting tool 50 useful for orienting one or more other tools 12 of the tool string 10 in accordance with various embodiments of the present disclosure. To assist the reader in following the description herein, the tools 12 in the tool string 10 which are uphole (to the left) of the exemplary orienting tool 50 are sometimes referred to herein as the upper, or uphole, tools or tool string section 16, while the tools 12 that are downhole (to the right) of the orienting tool 50 are sometimes referred to herein as the lower, or downhole, tools or tool string section 18.

In the illustrated example, the downhole tool string section 18 is a perforating gun string 20 used in oilfield applications (e.g., well completion) with tools 12 that include one or more perforating guns 22. The perforating guns 22 typically carry one or more explosives 24 (e.g., shaped charges) designed to fracture the earthen formation 34 in a desired direction from the borehole 30. In such applications, the uphole tool string section 16 often includes one or more eccentric weight bars (not shown) or the like, which can be used, among other things, to serve as the reference by which the explosives 24 of the perforating guns 22 are oriented. However, the tool string 10 may have any other configuration and include any different and/or additional types of tool(s) 12 and other components. Thus, the present disclosure and appended claims are in no way limited to use with perforating guns, or a perforating gun string, or by the configuration, components, features, capabilities and details of the tool string, except and only to the extent as may be expressly specified otherwise herein or in any particular claims hereof and only for such specific references or claims and other claims depending therefrom.

Still referring to FIG. 1, the orienting tool 50 may be used for any desired purposes. For example, the tool 50 may provide a connection between uphole and downhole tool string sections 16, 18 that is reliable, strong, secure, sealed, leakproof, does not depend upon the threads, strength and integrity of a small, thin, threaded ring or create any spaces, or gaps, in the OD of the tool string 10 or expose or jeopardize any seal members (e.g., seals 52, FIG. 7), allows easy, quick and reliable orientation of one or more tools 12 relative to one or more other tools 12 in the tool string 10 or the entire uphole and downhole tool string sections 16, 18 relative to one another, for any other purposes or a combination thereof. For other examples, the orienting tool 50 may be used with existing or standard tool string components, include a spinning-connection arrangement, such as with a first component (e.g., collar 80) that engages part of the tool string 10 and is rotatable relative to a second component (e.g., mandrel 60) that engages another part of the tool string, include a substantial, sturdy and reliable non-threaded ring (e.g., locking ring 100) useful to rotate and torque one of the other components and/or lock the desired relative orientation of the tool string sections (verses a small, thin threaded ring), include a box connection 94 with female threads 92 (e.g., FIG. 3) for connection with one of the tool string sections 16, 18, have any other purposes or a combination thereof.

Still referring to FIG. 1, the orienting tool 50 may have any suitable form, configuration, components, construction and operation. In this embodiment, the tool 50 includes at least three distinct parts, a main body, or mandrel, 60, a collar 80 and a locking ring 100. The exemplary mandrel 60 and collar 80 couple, and allow orientation of, the respective tool string sections 16, 18 and the locking ring 100 helps secure the desired orientation. While the exemplary mandrel 60, collar 80 and locking ring 100 are distinct and separate from one another, they could, in other embodiments, be combined, related or configured in any other suitable manner. Furthermore, the orienting tool 50 may have additional, fewer or different components.

In various embodiments, the mandrel 60, collar 80 and locking ring 100 may be configured to allow either tool string section 16, 18 to be selectively oriented relative to the other, interconnected and locked in the desired orientation without forming, or leaving, any gaps in the OD of the tool string 10 in any suitable manner. In this embodiment, the mandrel 60 is releasably, rigidly engageable with one among the upper and lower tool string sections 16, 18 and the collar 80, which extends at least partially over the main body 60, is releasably, rigidly engageable with the other tool string section 16, 18. The exemplary main body 60 and collar 80 are coupled together to allow them to be selectively rotatable relative to one another and selectively axially moveable concurrently. Selective independent rotation, for example, can allow one or more tools 12 connected to the collar 80 to be rotatably oriented relative to one or more tools 12 connected to the main body 60 or vice versa. For example, the collar 80 and lower tool string section 18 may be rotated relative to the mandrel 60 and uphole tools 16 to point the explosives 24 of the perforating gun(s) 22 in the same direction as the eccentric weight bar(s) (not shown) in the upper tool string section 16, or any other desired direction. Selective concurrent axial (linear) movement, for example, can allow the main body 60, collar 80 and other components to be locked together.

Figure 2:
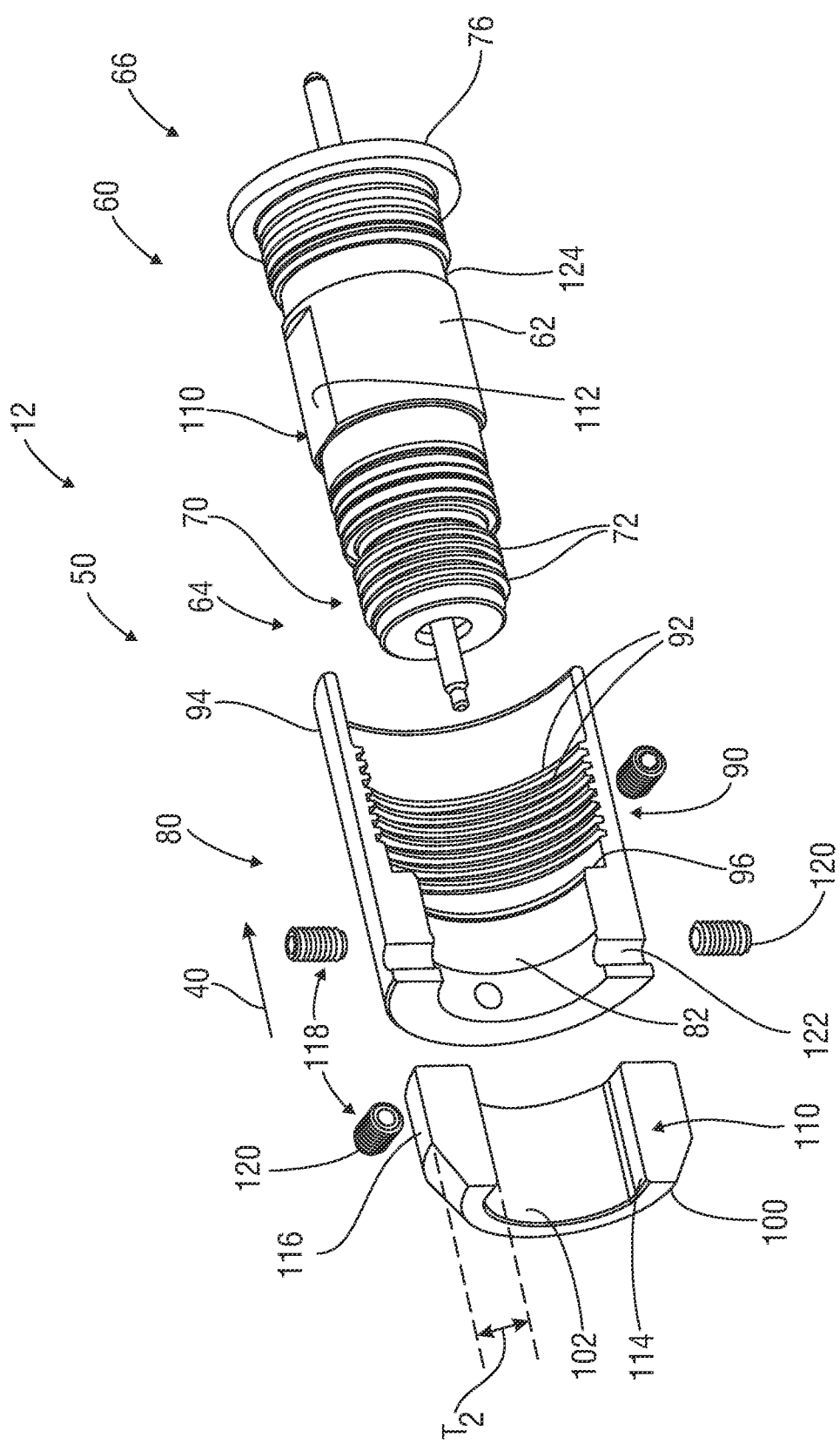
FIG. 2 is an exploded view of the exemplary orienting tool shown in FIG. 1.
Figure 3:
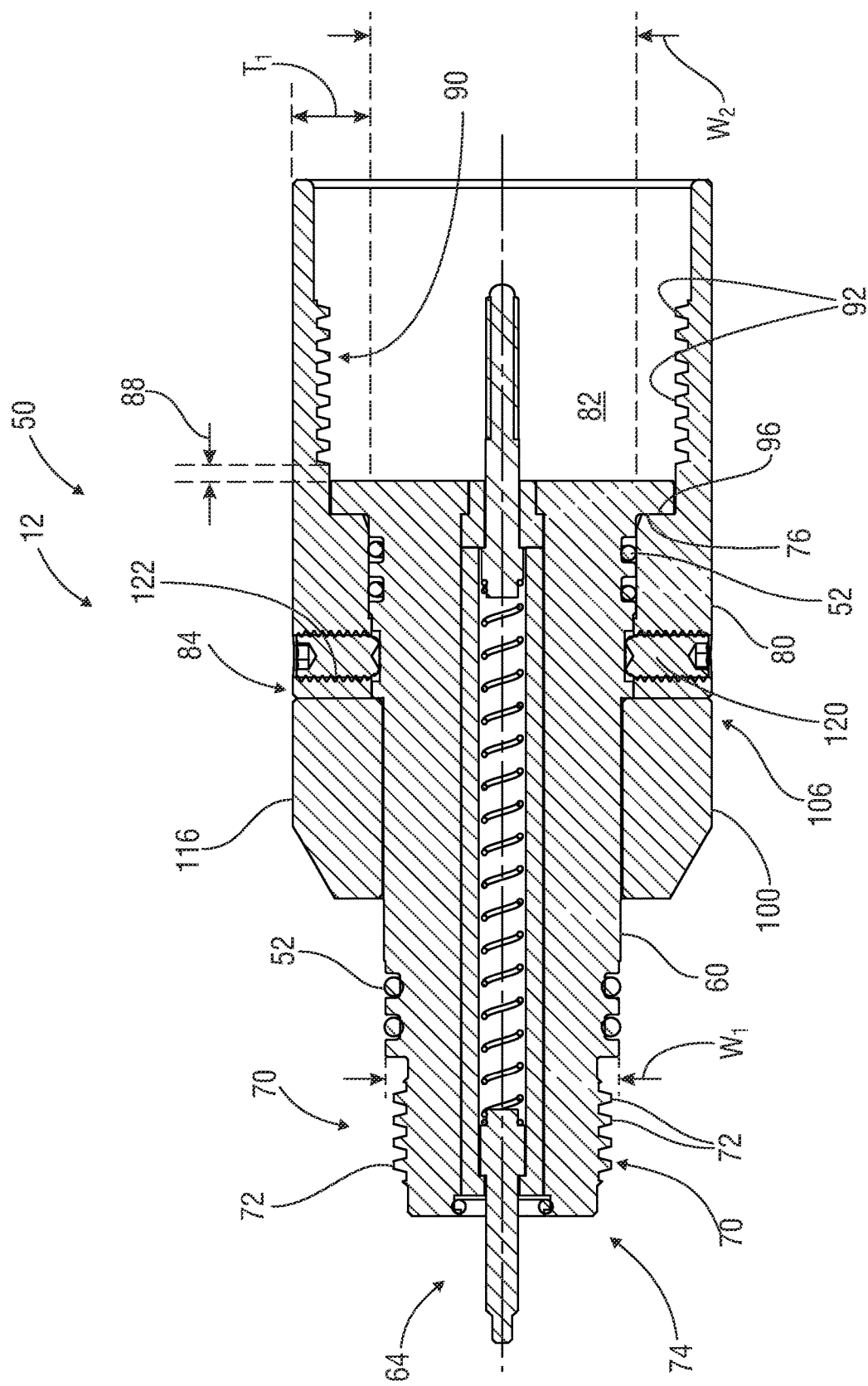
FIG. 3 is a cross-sectional view of the exemplary orienting tool of FIG. 1.

Referring now to FIGS. 2 & 3, when included, the main body 60 may have any suitable form, configuration and operation. In the present embodiments, the main body 60 is elongated and generally cylindrical and includes one or more connectors 70 at or proximate to its uphole end 64 for releasable, rigid engagement with the uphole tool string section 16 (e.g., FIG. 1) and at least one outwardly extending protrusion 76 closer to its downhole end 66 than its uphole end 64. The illustrated connectors 70 are a series of male threads 72 of a pin connection 74 formed at the uphole end 64 of the mandrel 60, but could have any other form (e.g., other mateable features), configuration and location. In some embodiments, the connectors 70 may couple the mandrel 60 to a ballistic release tool (BRT) or casing-collar locator (CCL) having a standard box connection 31 with female threads 32 (e.g., FIG. 5), or any other tool or mating piece serving as the lowermost uphole tool 16a. The protrusion 76 may be a ring-shaped shoulder extending around the entire circumference of the main body 60, include one or more ribs at one or more locations on the circumference or have any other suitable form and configuration. However, the mandrel 60 may have any other components, configuration and operation. For example, the mandrel 60 may not have any protrusions 76 and/or may be connectable to the lower tool string section 18. For another example, the mandrel 60 may have one or more bores or passageways extending partially or entirely therethrough, such as to house or allow the passage of other components (e.g., electrically conductive components, such as one or more pins, springs, insulators).

The exemplary collar 80, when included, may likewise have any suitable form, configuration and operation. In the present embodiments, the collar 80 is elongated and generally annular and includes one or more connectors 90 for releasable, rigid engagement with the downhole tool string section 18 (e.g., FIG. 1) and at least one protrusion 96 extending inwardly in a bore 82 thereof. The illustrated connectors 90 are a series of female threads 92 of a box connection 94 at the downhole end 86 of the collar 80, but could have any other form (e.g., other mateable features), configuration and location. In some embodiments, the female threads 92 may engage the male threads 25 of a pin connection at the upper end 19 of a tandem sub 26, or other component or tool, positioned as the uppermost downhole tool 18a (e.g., FIG. 4) to provide a strong, reliable connection and/or for any other reasons. The protrusion 96 may be a ring-shaped shoulder extending around the entire inner diameter of the bore 82 of the collar 80, include one or more ribs at one or more locations on the inner diameter or have any other suitable form and configuration.

Still referring to FIGS. 2 & 3, the illustrated collar 80 is slidable (e.g., arrow 40) over the main body 60 from the uphole end 64 of the main body 60 until at least one protrusion 96 of the collar 80 engages, or abuts, at least one protrusion 76 of the main body 60. Engagement of the respective protrusions 76, 96 couples the exemplary collar 80 to the mandrel 60, preventing further downhole movement of the exemplary collar 80 relative to the mandrel 60 and allowing the mandrel 60 to drag, or pull, the collar 80 in the uphole direction. In this embodiment, the illustrated collar 80 is thus selectively axially moveable with the main body 60 in the uphole direction, but selectively freely rotatable relative thereto (prior to locking the orienting tool 50 and upper and lower tool string sections 16, 18 together). However, the collar 80 may have any other components, configuration and operation. For example, the collar 80 be connectable to the upper tool string section 16, not have any protrusions 96, not be slidably engaged with the mandrel 60, etc.

The exemplary locking ring 100 may also have any suitable form, configuration and operation. In the present embodiments, the locking ring 100 is unthreaded and does not threadably engage any other components, but, in other configurations, could be threaded (e.g., for coupling to one or more other components). The illustrated locking ring 100 is slidable over the mandrel 60 from the uphole end 64 thereof until it engages, or abuts, the collar 80. For example, the downhole end 106 (or one or more shoulders) of the locking ring 100 may abut, or engage, the uphole end 84 (or one or more shoulders) of the collar 80. In this embodiment, the locking ring 100 can be dragged, or drawn, in the uphole direction with the main body 60 and collar 80 (e.g., to rigidly sandwich it between the collar 80 and uphole tool string section 16, FIG. 7). However, the locking ring 100 may have any other components, configuration and operation. For example, in other embodiments, the locking ring 100 may be slidable over or mateable with the collar 80, not abut the collar 80, not be slidable over the main body 60, and so on.

Still referring to FIGS. 2 & 3, the exemplary locking ring 100 can be selectively rotatable with the mandrel 60 (or other component(s)). For example, the locking ring 100 may be configured to be used to torque and rotate the mandrel 60 during one or more setup configurations of the orienting tool 50. In this embodiment, the orienting tool 50 includes one or more (e.g., non-threaded) rotational locks 110 to at least temporarily rotationally locking the main body 60 and locking ring 100 together, allowing their concurrent rotation and torque to be transmitted from or through the locking ring 100 to the main body 60. With the use of the rotational lock(s) 110, the exemplary locking ring 100 can be gripped and used to hold the position of, make up and/or rotate the main body 60, allow torque and rotational forces applied to the locking ring 100 to be transmitted to the mandrel 60, provide other benefits or a combination thereof. In the present embodiments, only the exemplary illustrated locking ring 100 (e.g., at least one outer surfaces 116 thereof) will need to be gripped (e.g. with a pipe wrench or other gripping tool) to rotate, or hold, the position of the mandrel 60 during use of the orienting tool 50. Eliminating the need to grip the exemplary mandrel 60 during use of the tool 50 can, for example, allow the mandrel 60 to be constructed with a compact, efficient size, allowing the use of valuable (e.g., annular) space for other components (e.g., the collar 80 and/or locking ring 100), provide any other benefits or a combination thereof. However, in other embodiments, the locking ring 100 may not be rotatable with the main body 60, may be rotatable with the collar 80 or other components or configured to operate in any other manner.

When included, the rotational lock(s) 110 may have any suitable form, configuration, location and operation. For example, the rotational lock(s) 110 may be non-threaded and more efficient than a threaded connection. In the present embodiments, the rotational lock 110 includes one or more pairs of corresponding engageable flats 112, 114 provided on the mandrel 60 and locking ring 100, respectively. When the respective flats 112, 114 are aligned, they will help prevent rotation of either component relative to the other and allow their concurrent rotation. In some instances, such as when at least part of the outer surface 62 of the exemplary mandrel 60 is cylindrical and the bore 102 of the locking ring 100 is circular, the respective flats 112, 114 may be planar. In the present embodiments, the mandrel 60 and locking ring 100 each include two pairs of respective corresponding at least substantially planar flats 112, 114 that align with, or engage (e.g. abut) one another when the locking ring 100 is seated in one or more setup and/or operating positions. However, the rotational lock(s) 110 may include only one, or more than two (e.g. 3, 4, 5, etc.), pairs of corresponding flats 112, 114 of any desired shape, configuration, operation and location, or any other type and quantity of suitable components (e.g., mating or interlocking components, gear mechanisms). Moreover, some embodiments may not include any rotational locks 110 and, if desired, allow at least some desired relative rotation between the locking ring 100 and mandrel 60 (or other component(s)).

Still referring to FIGS. 2 & 3, in another independent aspect, in some embodiments, at least part of the mandrel 60 may be formed with one or more widths, or outer diameters, $W_1$, $W_2$ that allows sufficient annular space thereabout for the collar 80 and/or locking ring 100 to have desired respective thicknesses $T_1$, $T_2$. For example, at least part of the collar 80 may be formed with at least one thickness $T_1$ that provides sufficient strength and stability to support and sustain its coupling a tool string section to the mandrel 60 during typical or expected operations, for any other purposes or a combination thereof. For another example, at least part of the locking ring 100 may be formed with at least one thickness $T_2$ to provide sufficient strength and stability to allow the locking ring 100 to be made up and torqued in order to make up and torque the mandrel 60, help secure and retain the orientation of the lower tool string section 18 relative to the upper tool string section 16 (or vice versa) during typical or expected operations, for any other purposes or a combination thereof.

In the present embodiments, the orienting tool 50 is configured so that once the lower tool string section 18 has been oriented as desired, the mandrel 60 can be tightened down to the upper tools 16, dragging the collar 80 and locking ring 100 in the uphole direction to rigidly sandwich the locking ring 100 between the collar 80 and lowermost uphole tool 16a. This represents the fully made-up position and operating configuration of the exemplary orienting tool 50, wherein none its components can rotate or move axially relative to the others, leaving no gaps in the OD of the tool string 10 between the upper and lower tool string sections 16, 18 and locking the relative position of the tool string sections 16, 18. If desired, a space 88 can be provided inside bore 82 of the collar 80 between the downhole end 66 of the mandrel 60 (e.g., FIG. 8) and the upper end 19 of the uppermost downhole tool 18a to prevent contact therebetween, allow the mandrel 60 and tool 18a to rotate relative to each other without axial friction therebetween, for any other purposes or a combination thereof.

Figure 8:
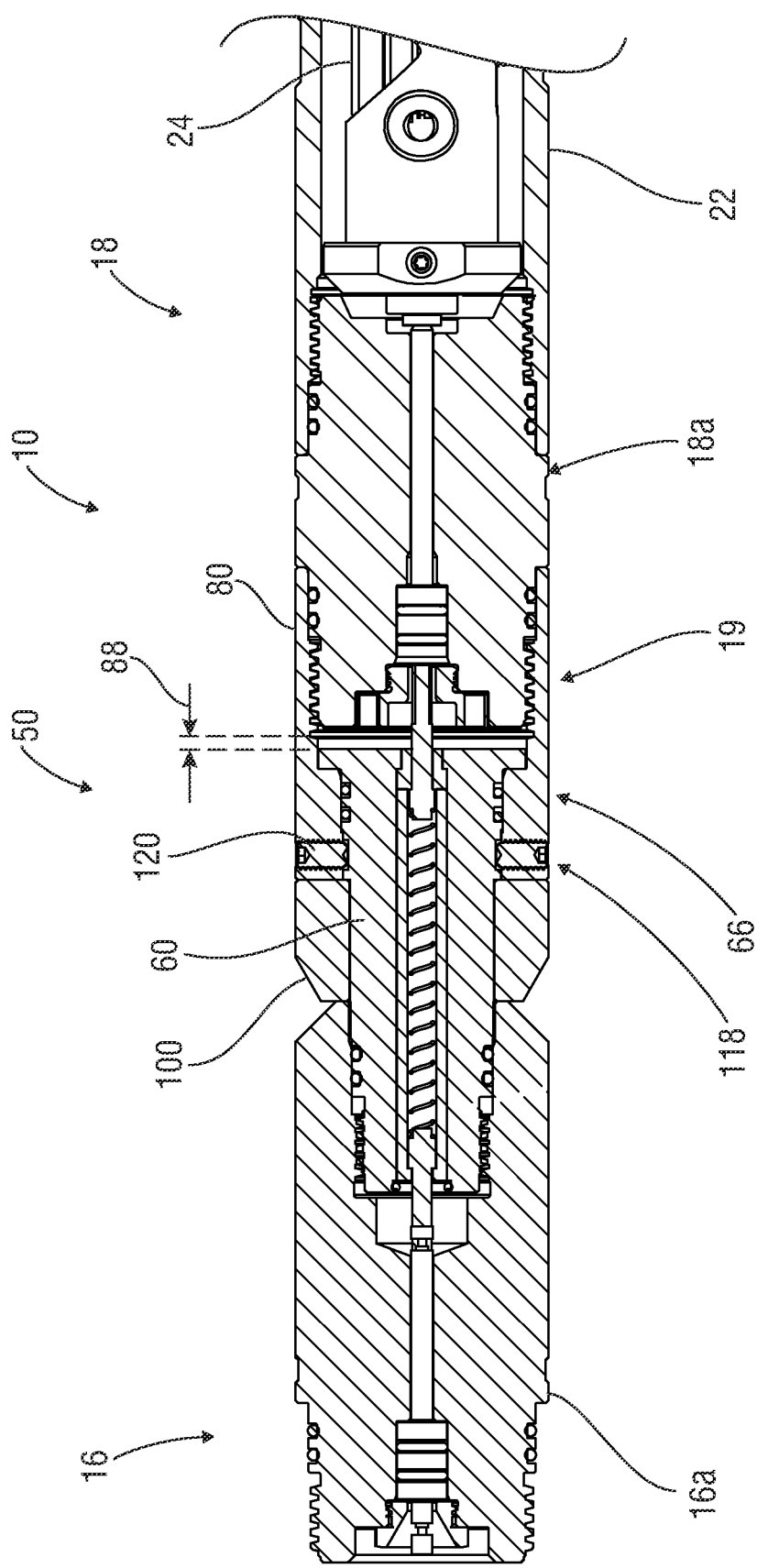
FIG. 8 is an enlarged view of the exemplary tool string shown in FIG. 1, which illustrates the grippers of the exemplary orienting tool secured to the mandrel thereof in accordance with one or more embodiments of the present disclosure.

Referring still to FIGS. 2 & 3, if desired, the orienting tool 50 may include one or more anchors 118 to help lock the orientation of the downhole tools 18 relative to the uphole tools 16, prevent relative rotational and/or axial movement between the components (mandrel 60, collar 80, locking ring 100, upper and lower tool string sections 16, 18), for any other purposes or a combination thereof. When included, the anchor(s) 118 may have any suitable form, construction, components, configuration, location and operation. In this embodiment, the anchors 118 include multiple grippers 120 extendable through the collar 80 and selectively engageable with the mandrel 60. For example, the grippers 120 (e.g., set screws) may be threadably engaged in respective corresponding holes 122 formed in the collar 80 and extendable into one or more grooves 124 formed in the outer diameter of the mandrel 60. As shown in FIG. 8, once the illustrated orienting tool 50 has been fully made up and secured between the upper and lower tool string sections 16, 18, the grippers 120 can be engaged with the mandrel 60. In this embodiment, the end of each gripper 120 is formed with teeth that can bite into the corresponding groove 124 of the mandrel 60 when the grippers 120 are screwed down to the mandrel 60. However, any other form and configuration of anchors 118 may be used. For example, the anchor(s) 118 may extend through the main body 60 and engage the collar 80. Moreover, the anchors 118 may not be included, but could be required or essential in other configurations. In the present and other embodiments, the anchors 118 are only optional and not necessary.

Figure 4:
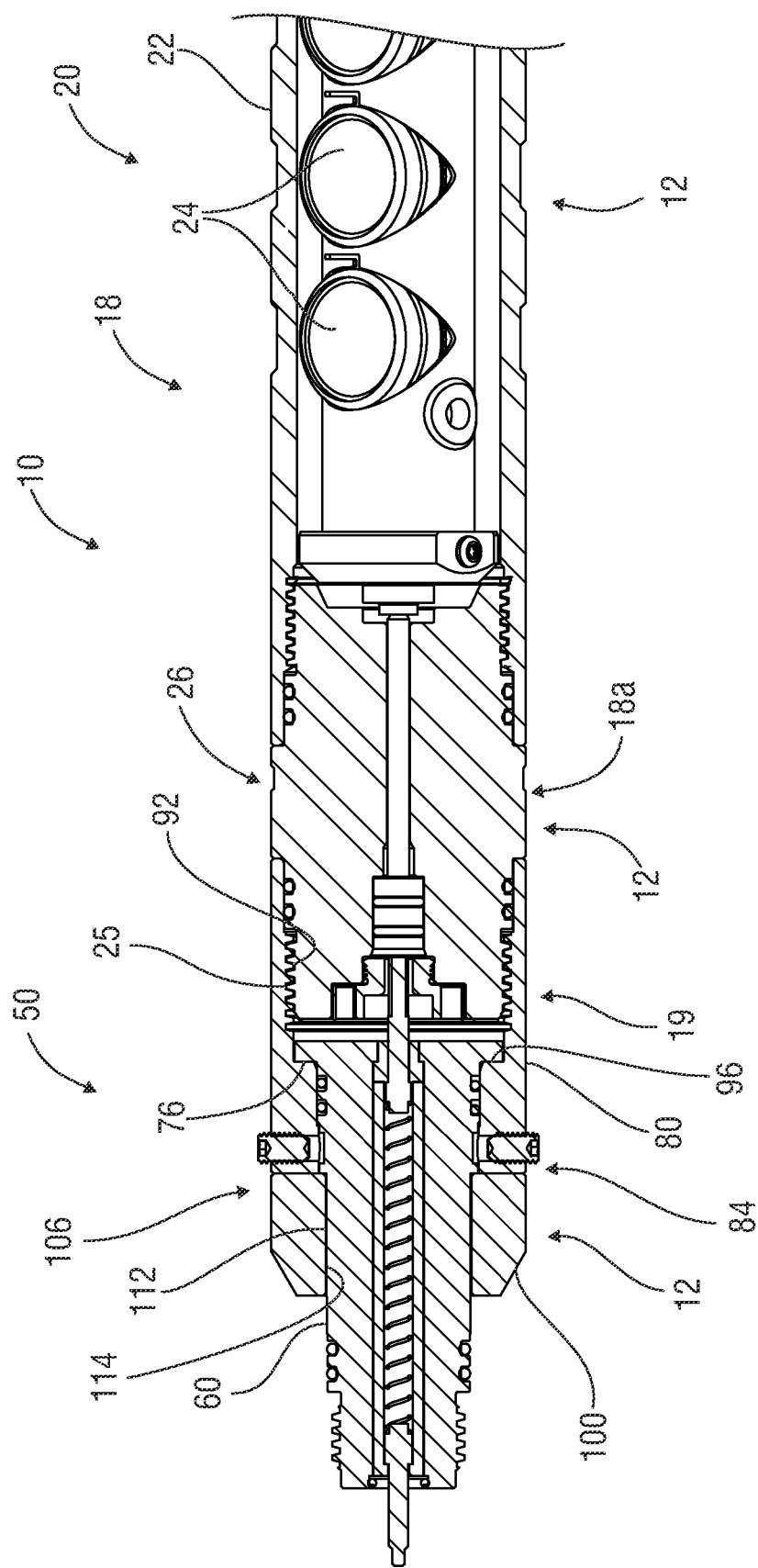
FIG. 4 is a partial cross-sectional view of the exemplary tool string of FIG. 1 shown before the exemplary orienting tool is coupled to the uphole tool string section in accordance with one or more embodiments of the present disclosure.
Figure 5:
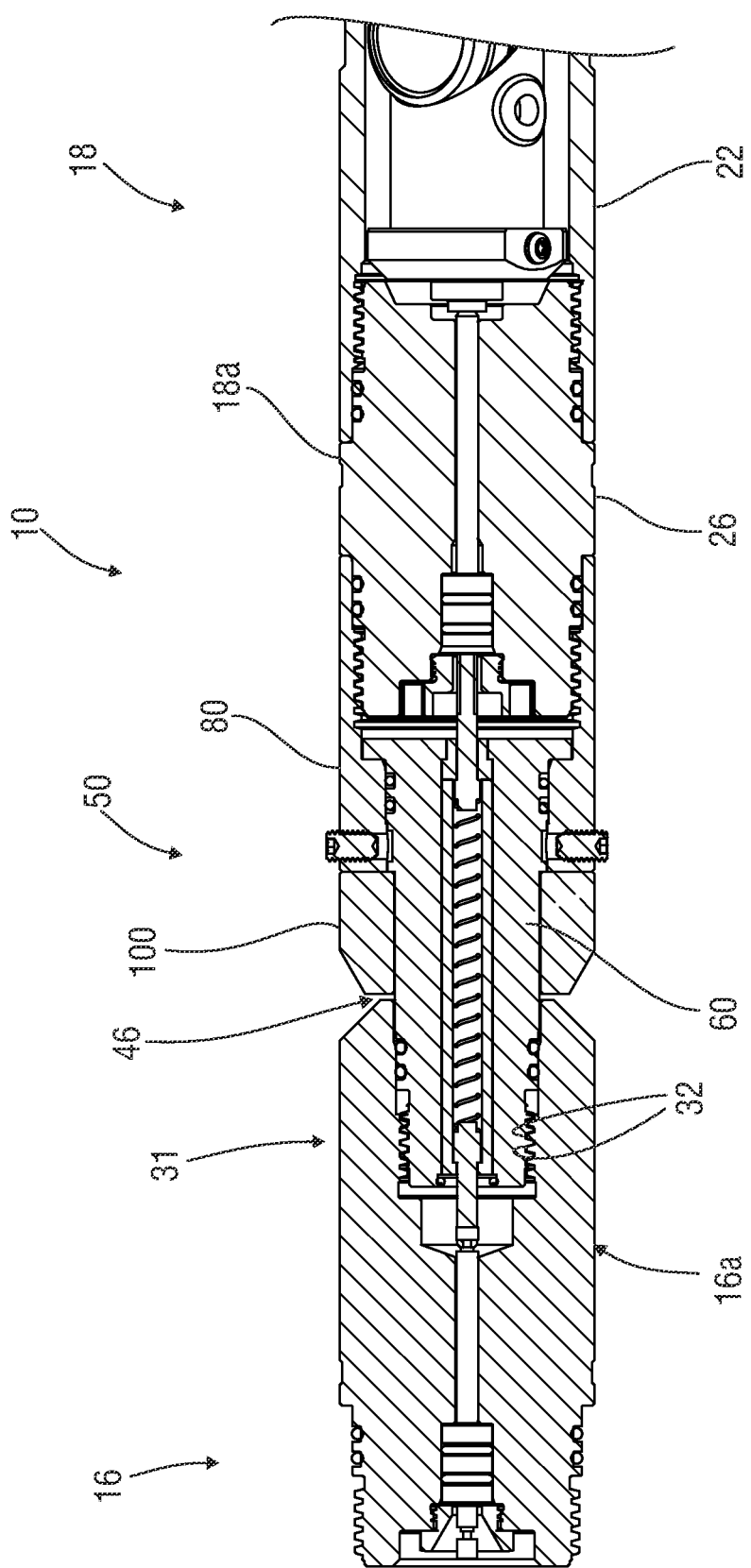
FIG. 5 is a partial cross-sectional view of the exemplary tool string shown in FIG. 4 with the mandrel of the exemplary orienting tool only partially engaged with the uphole tool string section in accordance with one or more embodiments of the present disclosure.

Referring now to FIGS. 4-5, in another independent aspect, various embodiments of the present disclosure involve methods of orienting one or more downhole tools 18 of a tool string 10 relative to one or more uphole tools 16 of the tool string 10 (or vice versa) prior to deploying the tool string 10 in a borehole. The illustrated uphole and downhole tool string sections 16, 18 are connected together with an orienting tool 50 having a mandrel 60, collar 80 and locking ring 100, which are not threadably engaged together. These exemplary methods include sliding the collar 80 over the mandrel 60, then sliding the locking ring 100 over the mandrel 60. For example, the collar 80 may be in a setup configuration when at least one protrusion 96 (e.g., shoulder) of the collar 80 engages, or abuts, one or more protrusions 76 of the mandrel 60. The illustrated locking ring 100 may be in a setup configuration when the downhole end 106 thereof abuts or engages the uphole end 84 of the collar 80, positioning one or more flats 114 of the locking ring 100 over one or more flats 112 of the mandrel 60 to rotatably lock the locking ring 100 and mandrel 60.

Typically, such as shown in FIG. 4, the exemplary collar 80 is then fully engaged with the uppermost downhole tool 18a. When threadable engagement with the tool string 10 is used, for example, the collar 80 could be rotated and torqued with a pipe wrench (or other gripping tool) for engagement with the tool 18a until it is made up tight. As shown in FIG. 5, the exemplary mandrel 60 is engaged with the lowermost uphole tool 16a, such as by threadable engagement (or any other suitable manner), but not tight. For example, the locking ring 100 could be gripped and rotated with a pipe wrench (or other gripping tool) to screw the mandrel 60 to the lowermost uphole tool 16a until it is almost flush therewith (e.g., without torque-locking). In some cases, a small visible space 46 may be seen between the lowermost uphole tool 16a and the locking ring 100, but is not necessary. In the present embodiments, at this stage, the collar 80 is fully engaged with the uppermost downhole tool 18a, but the mandrel 60 is not quite fully engaged with the lowermost uphole tool 16a, leaving some room for their full engagement later and allowing the locking ring 110 to be rotated without frictionally engaging the tool 16a.

Figure 6:
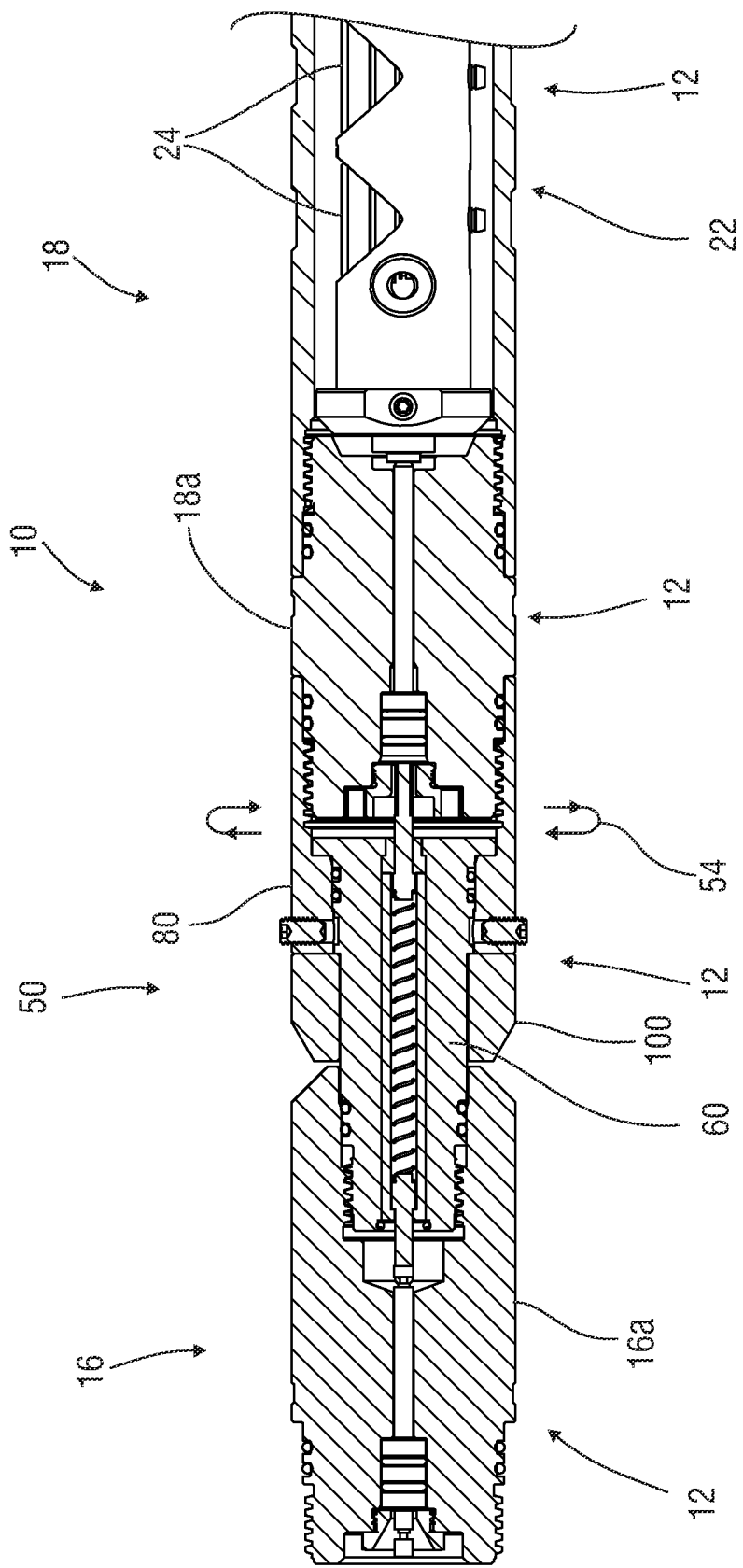
FIG. 6 is a partial cross-sectional view of the exemplary tool string shown in FIG. 5 after the collar of the exemplary orienting tool and downhole tool string section have been concurrently rotated to orient the shape charges of the perforating gun(s) as desired relative to the uphole tool string section in accordance with one or more embodiments of the present disclosure.

Now referring to FIG. 6, the exemplary collar 80 and the downhole tools 18 coupled thereto are then concurrently rotated in either direction (e.g., arrows 54) relative to the mandrel 60, locking ring 100 and upper tools 16 to selectively orient one or more the tools 12 of the downhole tool string section 18 relative one or more tools 12 of the uphole tool string section 16 as desired. For example, the collar 80 could be gripped and rotated with a pipe wrench (or other gripping tool) to rotate the downhole tool string section 18. In the present embodiments and when one or more perforating guns 22 are included in the downhole tool string section 18, the collar 80 and lower tool string section 18 may be rotated relative to the mandrel 60 and uphole tools 16 to move the explosives 24 into a desired operating position. (Note the different position of the explosives 24 in FIG. 5 as compared to FIG. 6).

Figure 7:
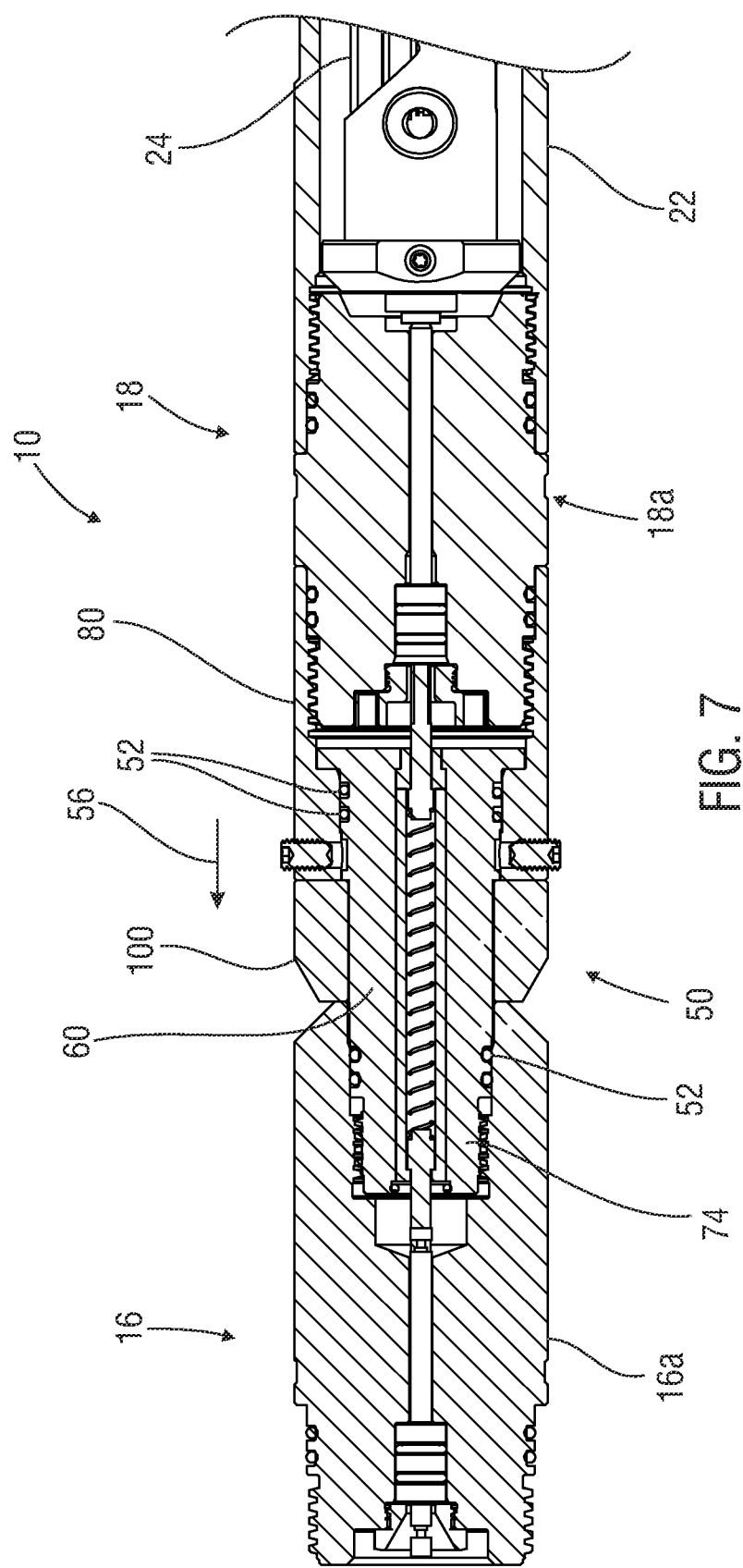
FIG. 7 is a partial cross-sectional view of the exemplary tool string shown in FIG. 6 after the mandrel of the exemplary orienting tool has been fully engaged with the uphole tool string section in accordance with one or more embodiments of the present disclosure.

Referring now to FIGS. 6 & 7, the desired relative orientation of the upper and lower tool string sections 16, 18 can thereafter be locked, or secured, in any suitable manner. In the present embodiments, that is done by now fully engaging the mandrel 60 with the lowermost uphole tool 16a, but without rotating the uphole tools 16, collar 80 and lower tools 18. For example, the locking ring 100 could be gripped and rotated with a pipe wrench (or other gripping tool) to rotate and torque the mandrel 60 until it is made up tight to the upper tools 16 (e.g., FIG. 7). The exemplary orienting tool 50 is configured so that as the pin connection 74 of the exemplary mandrel 60 is drawn further into the tool 16a by rotating the locking ring 100, the locking ring 100 and collar 80 (with lower tools 18 coupled thereto) will be dragged, or drawn along with it axially (e.g., arrow 56) toward the tool 16a. When the illustrated the mandrel 60 is fully engaged with lowermost uphole tool 16a, the locking ring 10 will be firmly, or rigidly, sandwiched between the tool 16a and collar 80 and any space 46 (e.g., FIG. 5) will be gone, so there will be no gap in the outer diameter of the tool string 10 between the lowermost upper tool 16a and the uppermost downhole tool 18a. The exemplary locking ring 100 thus shoulders up against the lowermost upper tool 16a and collar 80. The illustrated mandrel 60 and collar 80 will be fully made up to the upper and lower tools 16a, 18a, tightening together and frictionally and rotationally locking the lowermost upper tool 16a, mandrel 60, locking ring 100 and collar 80. In the present embodiments, none of these components can rotate or move axially relative to one another, representing an operating configuration of the orienting tool 50.

Referring to FIG. 8, if included, one or more exemplary anchors 118 may be engaged between the collar 80 and mandrel 60 to help lock the orientation of the downhole tools 18 relative to the uphole tools 16, prevent relative rotational and/or axial movement between the components (mandrel 60, collar 80, locking ring 100, upper and lower tool string sections 16, 18), for any other purposes or a combination thereof. It should be noted that the exemplary methods can include more or fewer actions, different actions or other actions provided in other parts of this patent or which are evident therefrom.

Referring again to FIGS. 1-3, in various broad embodiments of the present disclosure, an orienting tool 50 is useful for connecting and orienting a first set (16 or 18) of interconnected tools 12 of a tool string 10 with and relative to a second set of interconnected tools (16 or 18) of the tool string 10 prior to deployment of the tool string 10 in a borehole 30. The exemplary orienting tool 50 includes a main body 60 and collar 80, each connectable and disconnectable to at least one among the first and second tool sets 16, 18. In each particular use of the illustrated orienting tool 50, the collar 80 is connected to whichever tool set 16, 18 the main body 60 is not connected to. The exemplary main body 60 and collar 80 are interconnected so that, in at least one setup configuration of the orienting tool 50 (e.g., FIGS. 5-6), at least one among the main body 60 and collar 80, along with the respective tool set connected thereto, are rotatable relative to the other.

In these (and other) embodiments, a locking ring 100 is associated with at least one among the main body 60 and collar 80 and configured, in the setup configuration(s), to allow at least one among the main body 60 and collar 80, along with the respective tool set connected thereto, to be rotated relative to the other. In an operating configuration of the exemplary orienting tool 50 (e.g., FIG. 7), the locking ring 100 is configured to allow the main body 60 and tool set connected thereto to be rotationally locked relative to the collar 80 and tool set connected thereto.

Still referring to FIGS. 1-3, if desired, the collar 80 may be configured to be slidably engageable over the main body 60 from the uphole end 64 thereof, and the locking ring 100 may be slidably engageable over the main body 60 uphole of the collar 80 and configured to be rotationally lockable to the main body 60. The main body 60 may include at least a first protrusion 76 extending outwardly therefrom closer to the downhole end 66 than the uphole end 64 thereof and the collar 80 may be configured to be slidably engageable over the main body 60 until at least a first protrusion 96 of the collar 80 abuts the first protrusion 76 of the main body 60. The locking ring 100 may be unthreaded and configured to slide over the main body 60 until at least one flat 116 thereof aligns over at least one flat 112 of the main body 60 to rotationally lock the locking ring 100 to the main body 60. In the setup configuration(s) of the orienting tool 50, the locking ring 100 may be configured to be gripped and rotated in order to rotate one among the main body 60 and collar 80 relative to the other. In the operating configuration(s), the exemplary locking ring 100 may be rigidly sandwiched between a tool 12 of the first or second tool sets (16 or 18) and one among the main body 60 and collar 80 to ensure there are no gaps in the outer diameter of the tool string 10 between the tool sets 16, 18 (e.g., FIG. 7).

In these (and other) embodiments, the first tool set may be the upper tools 16 that are uphole of the orienting tool 50 and include at least a first eccentric weight bar, and the second tool set may be the lower tools 18 that are downhole of the orienting tool 50 and include at least a first perforating gun 22 having multiple explosives 24 (e.g., shape charges). In the setup configuration(s) (e.g., FIGS. 5-6), the exemplary main body 60, collar 80 and locking ring 100 may be configured to allow the shape charges 24 of the first perforating gun 22 to be oriented relative to the first eccentric weight bar as desired. In the operating configuration(s) (e.g., FIGS. 7-8), the main body 60, collar 80 and locking ring 100 may be configured to lock that desired orientation prior to deployment of the tool string 10 in the borehole 30. At least one gripper 120 (e.g., FIG. 8) may be extendable through the collar 80 and selectively engageable with the main body 60.

Still referring to FIGS. 1-3, various broad embodiments of the present disclosure of methods of connecting and orienting a first set (16 or 18) of interconnected tools 12 of a tool string 10 with and relative to a second set of (16 or 18) interconnected tools 12 of the tool string 10 prior to deployment of the tool string 10 in a borehole 30 use an orienting tool 50. The exemplary orienting tool 50 includes a main body 60 and collar 80, each connectable and disconnectable to at least one among the first and second sets of tools, and a locking ring 100 associated with at least one among the main body 60 and collar 80. These (and other) embodiments include partially connecting either the main body 60 or collar 80 to the first tool set (16 or 18) and fully connecting the other to the second tool set (16 or 18) (e.g., FIGS. 4-5). At least one among the exemplary main body 60 and collar 80, along with the respective tool set connected thereto, is rotated relative to the other (e.g., FIG. 6). Without rotating either tool set relative to the other, whichever among the exemplary main body 60 and collar 80 that was partially connected to one of the tool sets, is fully connected thereto to rotationally lock the first and second tool sets 16, 18 together (e.g., FIG. 7).

Still referring to FIGS. 1-3, if desired, the exemplary collar 80 may be slidably engaged over the main body 60 from the uphole end 64 of the main body 60 until at least a first protrusion 96 of the collar 80 abuts at least a first protrusion 76 of the main body 60. A locking ring 100 may be (e.g., non-threadably) engaged with at least one among the main body 60 and collar 80 and gripped and rotated to rotate the main body 60 or collar 80 to connect it to the first or second tool set. For example, the locking ring 100 may be slid over the main body 60 uphole of the collar 80 until at least one flat 114 of the locking ring 100 aligns over at least one flat 112 of the main body 60 to rotationally lock the locking ring 100 and main body 60.

In these (and other) embodiments, fully connecting whichever among the main body 60 and collar 80 that was partially connected to one of the tool sets 16, 18 to that tool set may ensure there are no gaps in the outer diameter of the tool string 10 between the first and second tool sets 16, 18 (e.g., FIG. 7). For example, the exemplary main body 60 may be initially partially connected to the first tool set (16 or 18) and then, later, fully connected to draw the collar 80 and locking ring 100 axially toward the first tool set until the locking ring 100 is rigidly sandwiched between the collar 80 and first tool set, preventing relative rotation and linear movement between the main body 60, locking ring 100, collar 80 and first and second tools sets 16, 18.

It should be understood that the present disclosure is not limited to the particular configurations of the orienting tool 50 as described and shown herein. For example, the orienting tool 50 may be reversed in axial orientation (or configured to be reversible), the mandrel 56 may be positioned downhole of the collar 80, the mandrel 60 may be connected to the lower tool string section 18 and collar 80 coupled to the upper tool string section 16, the functions of the mandrel 60 and collar 80 may be reversed, the locking ring 100 may be configured to rotate the collar 80, and so on.

Preferred embodiments of the present disclosure thus offer advantages over the prior art and are well adapted to carry out one or more of the objects of this disclosure. However, the present disclosure does not require each of the components and acts described above and is in no way limited to the above-described embodiments and methods of operation. Any one or more of the above components, features, aspects, capabilities and processes may be employed in any suitable configuration without inclusion of other such components, capabilities, aspects, features and processes. Accordingly, embodiments of the present disclosure may have any one or more of the features described or shown in this patent. Moreover, the present invention includes additional features, capabilities, functions, methods, uses and applications that have not been specifically addressed herein but are, or will become, apparent from the description herein, the appended drawings and claims.

The methods that may be described above, claimed herein or are apparent from this patent and any other methods which may fall within the scope thereof can be performed in any desired or suitable order and are not necessarily limited to any sequence described herein or as may be listed in any appended claims. Further, the methods of various embodiments of the present disclosure may include additional acts beyond those mentioned herein and do not necessarily require use of the particular embodiments shown and described herein, but are equally applicable with any other suitable structure, form and configuration of components.

While exemplary embodiments have been shown and described, many variations, modifications and/or changes of the system, apparatus, articles of manufacture and methods of the present disclosure, such as in the features, components, details of construction and operation and arrangements thereof and the manufacture, assembly and use thereof, are possible, contemplated by the present patentee, within the scope of any appended claims, and may be made and used by one of ordinary skill in the art without departing from the spirit, teachings and scope of this disclosure and any appended claims. Thus, all matter herein set forth or shown in the accompanying drawings should be interpreted as illustrative and the scope of this disclosure and any appended claims should not be limited to the embodiments described or shown herein.

The invention claimed is:

1. An orienting tool for connecting and orienting a first set of interconnected tools of a tool string with and relative to a second set of interconnected tools of the tool string prior to deployment of the tool string in a borehole, the orienting tool comprising:
   a main body connectable to and disconnectable from at least one among the first and second tool sets;
   a collar connectable to and disconnectable from at least one among the first and second tool sets, wherein, in each particular use of the orienting tool, the collar is configured to be connected to whichever tool set the main body is not connected to, further wherein the main body and collar are interconnected so that, in a setup configuration of the orienting tool, at least one among the main body and collar, along with the respective tool set connected thereto, are rotatable relative to the other; and
   a locking ring associated with at least one among the main body and collar and configured, in the setup configuration, to allow at least one among the main body and collar, along with the respective tool set connected thereto, to be rotated relative to the other, and wherein the locking ring, in an operating configuration of the orienting tool, is configured to allow the main body and tool set connected thereto to be rotationally locked relative to the collar and tool set connected thereto,
   wherein the main body has an uphole end and a downhole end, the collar is configured to be slidably engageable over the main body from the uphole end thereof and the locking ring is slidably engageable over the main body uphole of the collar and configured to be rotationally lockable to the main body, further wherein the locking ring is unthreaded and configured to slide over the main body until at least one flat of the locking ring aligns over at least one flat of the main body to rotationally lock the locking ring to the main body.

2. The orienting tool of claim 1 wherein the locking ring is configured to be gripped and rotated in order to rotate one among the main body and collar relative to the other.

3. The orienting tool of claim 1 wherein the tool string has an outer diameter extending along its length, further wherein in the operating configuration, the locking ring is rigidly sandwiched between a tool of the first or second tool sets and one among the main body and collar.

4. The orienting tool of claim 1 wherein the first tool set includes at least a first eccentric weight bar and the second tool set includes at least a first perforating gun having multiple shape charges, further wherein, in the setup configuration, the main body, collar and locking ring are configured to allow the shape charges of the first perforating gun to be oriented relative to the first eccentric weight bar as desired and, in the operating configuration, the main body, collar and locking ring are configured to lock that desired orientation prior to deployment of the tool string in the borehole.

5. The orienting tool of claim 1 wherein the main body has at least a first protrusion extending outwardly therefrom closer to the downhole end than the uphole end thereof and the collar is configured to be slidably engageable over the main body until at least a first protrusion of the collar abuts the first protrusion of the main body.

6. The orienting tool of claim 1 further including at least one gripper extendable through the collar and being selectively engageable with the main body.

7. The orienting tool of claim 1 wherein the main body, collar and locking ring are separate and distinct from each other.

8. A method of connecting and orienting a first set of interconnected tools of a tool string with and relative to a second set of interconnected tools of the tool string prior to deployment of the tool string in a borehole with the use of an orienting tool, the orienting tool including a main body having uphole and downhole ends and collar each connectable to and disconnectable from at least one among the first and second sets of tools and a locking ring associated with at least one among the main body and collar, the method comprising:
   slidably engaging the collar over the main body from the uphole end thereof until at least a first protrusion of the collar abuts at least a first protrusion of the main body;
   sliding the locking ring over the main body uphole of the collar until at least one flat of the locking ring aligns over at least one flat of the main body to rotationally lock the locking ring and main body;
   partially connecting either the main body or collar to the first tool set and fully connecting the other among the main body and collar to the second tool set;
   rotating at least one among the main body and collar, along with the respective tool set connected thereto, relative to the other among the main body and collar along with the respective tool set connected thereto; and without rotating either tool set relative to the other tool set, fully connecting whichever among the main body or collar was partially connected to one of the tool sets to that tool set to rotationally lock the first and second tools sets together.

9. The method of claim 8 further including engaging a locking ring with at least one among the main body or collar.

10. The method of claim 9 wherein the locking ring is not threadably engaged with the main body or collar.

11. The method of claim 9 further including gripping and rotating the locking ring to rotate one among the main body or collar to connect it to the first or second tool set.

12. The method of claim 8 wherein the main body is initially partially connected to the first tool set and fully connecting the main body to the first tool set draws the collar and locking ring axially toward the first tool set until the locking ring is rigidly sandwiched between the collar and first tool set.

13. The method of claim 12 wherein fully connecting the main body to the first tool set prevents relative linear movement between the main body, locking ring, collar and first and second tools sets.

14. The method of claim 8 wherein the collar includes a bore, further including the collar providing a space in the bore thereof between the main body and an adjacent tool of first or second tool set.

15. The method of claim 8 further including forming the main body, collar and locking ring to be separate and distinct from each other.

16. An orienting tool for connecting and orienting a first set of interconnected tools of a tool string with and relative to a second set of interconnected tools of the tool string prior to deployment of the tool string in a borehole, the tool string having an outer diameter extending along its length, the orienting tool comprising:

a mandrel having an uphole end and a downhole end and being connectable to and disconnectable from at least one among the first and second sets of tools;

a collar connectable to and disconnectable from at least one among the first and second sets of tools, wherein, in each particular use of the orienting tool, the collar is configured to be connected to whichever set of tools the mandrel is not connected to, further wherein the mandrel and collar are interconnected so that, in a setup configuration of the orienting tool, at least one among the mandrel and collar, along with the respective tool set connected thereto, are rotatable relative to the other among the mandrel and collar along with the respective tool set connected thereto; and an unthreaded locking ring having first and second ends and being engageable and rotatable with the mandrel or collar, the locking ring being configured to be rotated in order to connect whichever among the mandrel and collar is engaged therewith to the corresponding tool set thereof, wherein the collar is configured to be slidably engageable over the mandrel from the uphole end thereof and the locking ring is slidably engageable over the mandrel uphole of the collar and configured to be rotationally lockable to the mandrel, further wherein the locking ring is configured to slide over the mandrel until at least one flat of the locking ring aligns over at least one flat of the mandrel to rotationally lock the locking ring to the mandrel, wherein when the orienting tool is in a setup configuration, the locking ring is rotatable to rotate at least one among the mandrel and collar, along with the respective tool set connected thereto, relative to the other among the mandrel and collar along with the respective tool set connected thereto, and when the orienting tool is in an operating configuration, the first end of the locking ring abuts the mandrel or collar and the second end of the locking ring abuts a tool from the first or second tool sets so that the second set of tools and the mandrel and tool set connected thereto are rotationally locked relative to the collar and tool set connected thereto.

17. The orienting tool of claim 16 wherein the mandrel and collar are elongated, and the mandrel, collar and locking ring are distinct and separate from each other.

* * * * *